United States Patent
Chen et al.

[11] Patent Number: 5,948,491
[45] Date of Patent: Sep. 7, 1999

[54] TONER FUSER MEMBER AND NEW ADHESION PRIMING COMPOSITION INCLUDED THEREIN

[75] Inventors: Jiann-Hsing Chen, Fairport; Muhammed Aslam, Rochester, both of N.Y.; Chengchang Chen, East Brunswick, N.J.

[73] Assignee: Eastman Kodak Company, Rochester, N.Y.

[21] Appl. No.: 08/782,899

[22] Filed: Jan. 11, 1997

[51] Int. Cl.$^6$ ...................................................... B32B 27/38
[52] U.S. Cl. .................. 428/35.7; 428/35.8; 428/334; 428/335; 428/336; 428/412; 428/413; 428/416; 428/422; 428/473.5; 428/474.4; 525/523
[58] Field of Search ................... 428/35.7, 35.8, 428/334, 335, 336, 412, 413, 416, 422, 473.5, 474.4; 525/523, 342, 359.3, 359.4, 359.5

[56] References Cited

U.S. PATENT DOCUMENTS

| | | | |
|---|---|---|---|
| 3,255,131 | 6/1966 | Ahlbrecht et al. | 525/523 X |
| 5,089,363 | 2/1992 | Rimai et al. | 430/45 |
| 5,200,284 | 4/1993 | Chen et al. | 430/33 |
| 5,233,008 | 8/1993 | Chen et al. | 528/33 |
| 5,362,833 | 11/1994 | Chen et al. | 528/25 |
| 5,411,779 | 5/1995 | Nakajima et al. | 428/36.91 |
| 5,529,847 | 6/1996 | Chen et al. | 428/413 |

*Primary Examiner*—Fred Teskin
*Attorney, Agent, or Firm*—Anne B. Kiernan; Doreen M. Wells

[57] ABSTRACT

A priming agent composition useful for binding a layer containing a fluorocarbon polymeric material to a metallic or an organic polymeric substrate comprises about 98 to 99.99 weight percent of a crosslinked, glycidyl end-capped bisphenolic polymer and about 0.01 to 2 weight percent of a perfluoroalkylsubstituted glycidyl-reactive compound. A toner fuser member comprises a substrate to which a surface layer comprising an amorphous fluoroplastic material is adhered by an intervening layer comprising the described priming agent composition. The fuser member comprises metal or an organic polymeric material in the shape of a cylinder or, preferably, a belt.

18 Claims, No Drawings

TONER FUSER MEMBER AND NEW ADHESION PRIMING COMPOSITION INCLUDED THEREIN

FIELD OF THE INVENTION

This invention relates in general to electrostatographic imaging and, in particular, to toner fuser members. More particularly, this invention relates to an improved fuser member that includes a new adhesion priming composition.

BACKGROUND OF THE INVENTION

In electrostatographic imaging and recording processes such as electrophotographic copying, an electrostatic latent image formed on a photoconductive surface is developed with a thermoplastic toner powder, which is thereafter fused to a receiver. The fuser member can be a roll, belt or any surface having the suitable shape for fixing thermoplastic toner powder to the receiver. The fusing step commonly consists of passing the receiver, for example, a sheet of paper on which toner powder is distributed in an imagewise pattern, through the nip of a pair of rolls. At least one of the rolls is heated; in the case where the fuser member is a heated roll, a smooth resilient surface is bonded either directly or indirectly to the core of the roll. Where the fuser member is in the form of a belt, it is preferably a flexible endless belt having a smooth, hardened outer surface that passes around the heated roller. A persistent problem with electrostatographic fusing systems, known as offset, is the adhesion of heat-softened toner particles to the surface of the fuser member rather than the receiver during passage through the rolls. Any toner remaining adhered to the fuser member can cause a false offset image to appear on the next sheet that passes through the rolls and can also degrade the fusing performance of the member. Another possible problem is degradation of the member surface caused by continued heating, which results in an uneven surface and defective patterns in thermally fixed images.

Toner fuser rolls are composed of a cylindrical core that may include a heat source in its interior, and a resilient covering layer formed directly or indirectly on the surface of the core. A thin layer of a suitable primer is advantageously coated on the surface of the core in order to improve bonding of the layer. Roll covering layers are commonly made of fluorocarbon polymers or silicone polymers, for example, poly(dimethylsiloxane) polymers of low surface energy, which minimizes adherence of toner to the roll. Frequently, release oils composed of, for example, poly (dimethylsiloxanes) are also applied to the fuser roll surface to prevent adherence of toner to the roll. Such release oils may interact with the resilient layer upon repeated use and in time cause swelling, softening, and degradation of the roll. Silicone rubber covering layers that are insufficiently resistant to release oils and cleaning solvents are also susceptible to delamination of the roll cover after repeated heating and cooling cycles.

Toner fuser belts are composed of a continuous flexible material having superior resistance to heat and a smooth surface. The belt substrate can be metallic or polymeric. The surface of the belt is composed of a thinly coated, low surface energy polymer such as a fluorocarbon or a silicone resin. There is a need for coating compositions which adhere strongly to the belt and form a hard, tough surface that is resistant to wear and cracking. The surface should also be resistant to cleaning solvents and fluids.

In electrostatographic imaging processes dry developers can be used to form an image on a receiving surface such as a sheet of paper. Dry developers usually comprise a toner powder and carrier particles. Carrier particles and toner particles have different triboelectric values. As the developer mixture is agitated, the particles rub together and the toner and carrier particles acquire opposite electric charges and cling together. In the subsequent development step the somewhat higher opposite charge of the electrostatic latent image draws the colored toner from the carrier and develops the image. Various addenda are frequently used to improve the properties of the toner and carrier particles.

Toners comprise, as a major component, the binder and, as minor components, a colorant and a charge control agent. The binder can be any resin having properties suitable for dry toners. Many such resins are known, but thermoplastic resins that are fixable by fusing are especially useful. When a dry toner powder image is transferred from one surface to another, defects in the image can occur. It is known from U.S. Pat. No. 4,758,491 that the addition of low surface energy liquid or solid addenda, especially polymers containing organopolysiloxane segments, may alleviate many of these defects.

Carrier particles comprise magnetizable irregular particles that are usually coated with a film of a polymeric material, which helps develop the triboelectric charge and aids the transfer of the toner. The coating material must adhere well to the carrier particle because the toner charge decreases as the polymer wears off. Polymers with low surface energy properties are especially useful for coating carrier particles.

Recent electrophotographic apparatus and processes are disclosed in U.S. Pat. Nos. 5,089,363 and 5,411,779, the disclosures of which are incorporated herein by reference. Specifically, U.S. Pat. No. 5,089,363 discloses a method for producing a high gloss multicolor image by pressing the toner image receiving sheet and ferrotyping belt between a pair of hard rollers.

U.S. Pat. No. 5,411,779 describes an apparatus having an image-fixing belt with a polyimide resin inner layer and a fluoroplastic outer layer that produces unglossed, matt images.

Other fuser belt systems are described in U.S. Pat. Nos. 5,200,284; 5,233,008; 5,330,840; 5,362,833; and 5,529,847, the disclosures of which are incorporated herein by reference.

The ferrotyping belt used for the production of high gloss images typically consists of a metal or an organic polymeric substrate on which is coated a release layer formed from a highly crosslinked organopolysiloxane. Such release layers, however, often display poor mechanical properties, including inadequate adhesion to the metal support. They are also susceptible to rapid wear upon repeated contact with abrasive receiving sheets such as bond paper or uncoated laser print paper. Thus, there remains a need for fuser belts having durable surface layer compositions that adhere well to the substrate and are capable of producing multiple high quality, high gloss toner images, including multicolor images. This need is well met by the toner fuser member and included priming agent composition of the present invention.

SUMMARY OF THE INVENTION

In accordance with the present invention, a priming agent composition useful for binding a layer containing a crystalline, semi-crystalline, or amorphous fluorocarbon polymeric material to a metallic or an organic polymeric substrate comprises about 98 to 99.9 weight percent of a crosslinked, glycidyl end-capped bisphenolic polymer and about 0.01 to 2 weight percent of a perfluoroalkylsubstituted glycidyl-reactive compound.

The crosslinked, glycidyl end-capped bisphenolic polymer has the formula

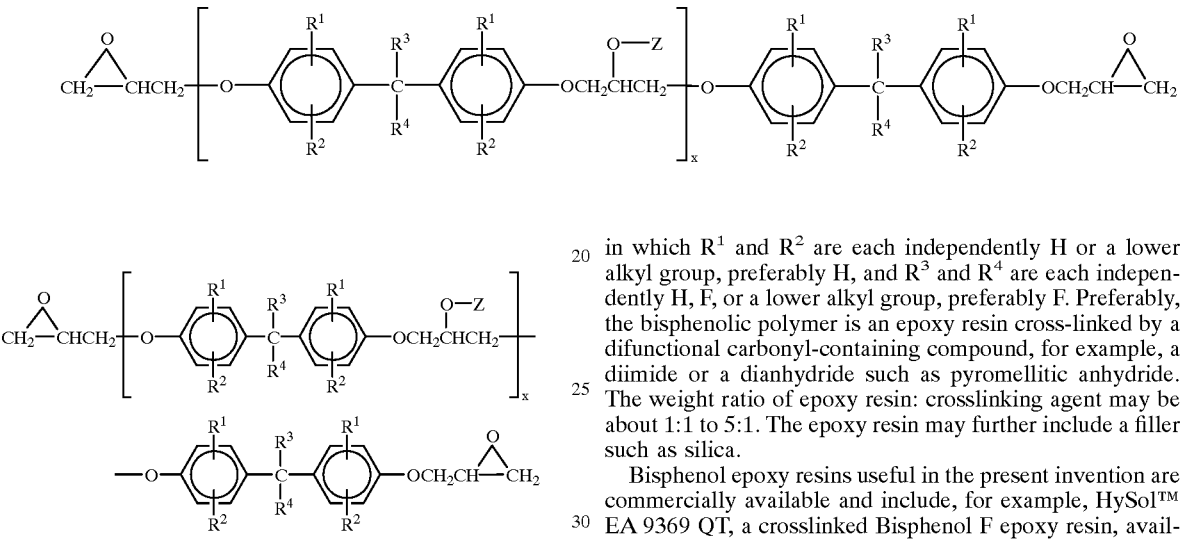

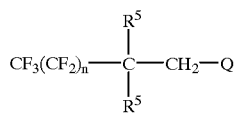

where $R^1$ and $R^2$ are each independently H or an alkyl group containing 1 to about 4 carbon atoms, and $R^3$ and $R^4$ are each independently H, F, or an alkyl group containing 1 to about 4 carbon atoms, Z is a carbonyl cross-linking group, and x is an integer from 1 to about 10. The perfluoroalkyl-substituted glycidyl-reactive compound has the formula $$CF_3(CF_2)_n\text{—}\underset{R^5}{\overset{R^5}{C}}\text{—}CH_2\text{—}Q$$

where $R^5$ is H or F, Q is OH or $SiR^6R^7R^8$, $R^6$, $R^7$, and $R^8$ being independently selected from the group consisting of Cl, OH, an alkyl group containing 1 to about 4 carbon atoms, an alkoxy group containing 1 to about 4 carbon atoms, an acyloxy group containing 2 to about 4 carbon atoms, and an amino group containing 0 to about 4 carbon atoms; and n is an integer from 1 to about 15; with the proviso that, when Q is $SiR^6R^7R^8$, at least one of $R^6$, $R^7$, and $R^8$ is Cl, OH, or an alkoxy, acyloxy, or amino group.

Also in accordance with the present invention, a toner fuser member comprises a substrate to which a surface layer comprising an amorphous fluoroplastic material is adhered by an intervening layer comprising the above-described priming agent composition. The fuser member substrate comprises metal or an organic polymeric material in the shape of a cylinder or, preferably, a belt.

The toner fuser belt of the invention is characterized by good wear and abrasion resistance and by excellent adhesion between the substrate and the amorphous fluoroplastic layer, which has a low coefficient of friction and an extremely low surface energy. Fused toner images, including multicolor images, obtained with the belt exhibit high gloss and excellent clarity.

DETAILED DESCRIPTION OF THE INVENTION

In the priming agent composition of the present invention, the crosslinked, glycidyl end-capped polymer is a bisphenolic polymer of the formula in which $R^1$ and $R^2$ are each independently H or a lower alkyl group, preferably H, and $R^3$ and $R^4$ are each independently H, F, or a lower alkyl group, preferably F. Preferably, the bisphenolic polymer is an epoxy resin cross-linked by a difunctional carbonyl-containing compound, for example, a diimide or a dianhydride such as pyromellitic anhydride. The weight ratio of epoxy resin: crosslinking agent may be about 1:1 to 5:1. The epoxy resin may further include a filler such as silica.

Bisphenol epoxy resins useful in the present invention are commercially available and include, for example, HySol™ EA 9369 QT, a crosslinked Bisphenol F epoxy resin, available from Dexter Aerospace, and Eccobond™ 104, a two-part epoxy resin composition from Emerson & Cuming Inc.

The perfluoroalkylsubstituted glycidyl-reactive compound included in the priming agent composition of the invention is represented by the formula

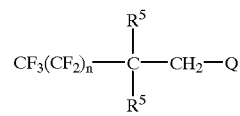

where $R^5$ is H or F, Q is OH or $SiR^6R^7R^8$, $R^6$, $R^7$, and $R^8$ being alkyl groups or moieties that react with the bisphenol glycidyl end groups. At least one of $R^6$, $R^7$, and $R^8$ is such a reactive moiety, selected from among Cl, OH, alkoxy, acyloxy, or amino. Preferably, at least one of $R^6$, $R^7$, and $R^8$ is Cl or alkoxy. In more preferred compounds, $R^6$ and $R^7$ are each Cl, or $R^6$, $R^7$, and $R^8$ are each methoxy or ethoxy.

The perfluoroalkylsubstituted glycidyl-reactive compound in the priming agent composition preferably contains about 7 to 21 fluorine atoms. Especially preferred compounds are 1,1,2,2-tetrahydro-tridecafluorooctyl-1-methyldichlorosilane, $CF_3(CF_2)_5CH_2CH_2Si(CH_3)Cl_2$, available from United Chemical, and 1,1,2,2-tetrahydro-heptadecafluorodecyl-1-triethoxysilane, $CF_3(CF_2)_7CH_2CH_2Si(OC_2H_5)_3$, available from PCR. Other preferred compounds include 1,1,2,2-tetrahydro-heptadecafluoro-1-decanol, $CF_3(CF_2)_7CH_2CH_2OH$, available from Narchem Corp., and 1,1-dihydro-nonadecafluoro-1-decanol, $CF_3(CF_2)_8CH_2OH$, available from Crescent Chemical Co.

The above-described priming agent composition is included in the toner fuser member, preferably a fuser belt, of the present invention. The fuser belt comprises a substrate, which may be formed of a metal or an organic polymeric material. Suitable metals include, for example, steel, stainless steel, aluminum, copper, and nickel. Organic polymers suitable as toner belt substrates include, for example, thermoset polyamide-imides, polycarbonates, polyesters, and, preferably, polyimides.

A surface layer comprising an amorphous fluoroplastic material is adhered to the fuser belt substrate by an intervening layer of the described priming agent composition. The amorphous fluoroplastic material is preferably a polymer comprising tetrafluoroethylene monomer units. Especially useful amorphous fluoroplastic materials are copolymers of tetrafluoroethylene and bis(trifluoromethyl) methylenedioxy-1,2-difluoroethylene. Such materials having the formula

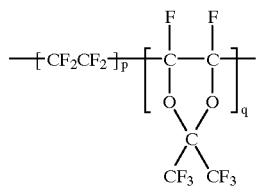

are commercially available, for example, Teflon™ AF1600 (p=35, q=65) and Teflon™ AF2400 (p=20, q=80), both from DuPont.

In the toner fuser belt of the invention, the layer of priming agent composition applied to the substrate, which is preferably polyimide, has a thickness of about $0.1\mu$ to $2\mu$, preferably about $0.5\mu$ to $1\mu$. The surface layer comprising amorphous fluoroplastic material has a thickness of about $1\mu$ to $20\mu$, preferably about $5\mu$ to $10\mu$.

Surface energies were determined by contact angle measurements using a Rame-Hart NRL Model A-100 Contact Angle Goniometer.

The surface energy of the surface layer of the fuser belt is very low, about 10 to 25 dynes/cm$^2$, which provides better release of toner without the use of release oils. The fuser belt provides a surface finish of the fused toner image of $G_{20}$ gloss greater than 70, preferably greater than 80. The gloss measurements can be determined by the method described in ASTM 523-67, using a BYK & Gardner Micro Gloss Meter set at 20 degrees.

The following examples further illustrate the invention:

EXAMPLE 1
Preparation of priming agent compositions

A. Solutions of 50 g of Eccobond™ 104, Part A (from Emerson & Cuming) in 200 g of tetrahydrofuran (THF) and 32 g of Eccobond™ 104, Part B in 218 g of THF were prepared. Also prepared was a solution of 1.5 g (1 mL) of 1,1,2,2-tetrahydro-tridecafluorooctyl-1-methyldichlorosilane (T2491, from United Chemical) in 17 g of THF.

To a mixture of 60 ml each of the Eccobond™ 104 Part A and Part B solutions was added 0.2 ml of the PCR T2491 solution. The resulting mixture was designated priming agent composition A.

B. Solutions of 45 g of HySol™ EA 9369 QT (from Dexter Aerospace) in 255 g of THF and of 1.4 g (1 mL) of 1,1,2,2,-tetrahydro-heptadecylfluorodecyl-1-triethoxysilane (PCR 12401-6) in 17 g of THF were prepared.

To 120 ml of the Hysol™ solution was added 0.2 ml of the PCR 12401-6 solution. The resulting mixture was designated priming agent composition B.

EXAMPLE 2
Preparation of a toner fuser belt

A seamless endless polyimide belt (from Gunze) having a length (circumference) of 82.3 cm and a width of 25.4 cm (32.4 in×10 in) was wiped clean, first with alcohol and then with methyl ethyl ketone, using a lint-free cloth. The cleaned belt was ring-coated with 120 mL of priming agent composition A of Example 1. The primer-coated belt was ramp heated from room temperature to 150° C. over a period of 0.5 hr, then held at 150° C. for 3 hr. The thickness of the priming agent layer was about $1\mu$.

The primed belt was ring-coated with about 100 mL of a 3% solution of Teflon™ AF 1600 in Fluorinert™ FC-75 solvent (from 3M), then ramp heated from 60° C. to 150° C. over 0.5 hr and held at 150° C. for 0.5 hr longer. A second coating of about 100 mL of the Teflon™ AF 1600 solution was applied to the belt, which was then ramp heated over 1 hr to 200° C. and held at 200° C. for 12 hr longer. The Teflon™ AF 1600 surface layer had a thickness of about 5 $\mu$, and its surface energy was 20.5 dyne/cm$^2$. Adhesion of the surface layer to the polyimide belt substrate was excellent.

EXAMPLE 3
Toner fuser belt testing

The toner fuser belt prepared as described in Example 2 was tested by mounting on a fuser system using Ricoh NC 5006 toner and having a Silastic™J (available from Dow Corning Co.) coated pressure roller at a nip load of approximately 15 kg/cm. The nip width was about 0.6 cm, and the fuser speed was about 4 cm/sec. The fusing temperature was about 118° C. (250° F.), and the release temperature was about 38° C. (100° F.).

The fuser belt displayed excellent wear characteristics, giving more than 17,000 copies on laser print paper without appreciable degradation. The $G_{20}$-image gloss of the prints was about 88.

The invention has been described in detail with particular reference to preferred embodiments thereof, but it will be understood that variations and modifications can be effected within the spirit and scope of the invention.

What is claimed is:

1. A toner fuser member comprising:

a substrate, and a surface layer comprising an amorphous fluoroplastic material, wherein said surface layer is adhered to said substrate by an intervening layer of a priming agent composition, said composition comprising:

about 98 to 99.99 weight percent of a crosslinked, glycidyl end-capped bisphenolic polymer having the formula

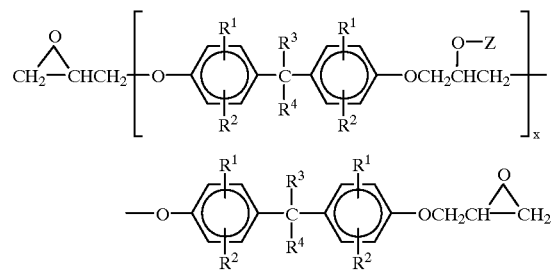

wherein $R^1$ and $R^2$ are each independently H or an alkyl group containing 1 to about 4 carbon atoms, $R^3$ and $R^4$ are each independently H, F, or an alkyl group containing 1 to about 4 carbon atoms, Z is a carbonyl cross-linking group, x is an integer from 1 to about 10; and about 0.01 to 2 weight percent of a perfluoroalkylsubstituted glycidyl-reactive compound having the formula

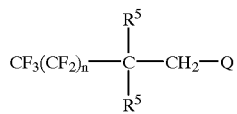

wherein $R^5$ is H or F, Q is OH or $SiR^6R^7R^8$, $R^6$, $R^7$, and $R^8$ are independently selected from the group consisting of Cl, OH, an alkyl group containing 1 to about 4 carbon atoms, an alkoxy group containing 1 to about 4 carbon atoms, an acyloxy group containing 2 to about 4 carbon atoms, and an amino group containing 0 to about 4 carbon atoms; and n is an integer from 1 to about 15; with the proviso that, when Q is $SiR^6R^7R^8$, at least one of said $R^6$, $R^7$, and $R^8$ is Cl, OH, or an alkoxy, acyloxy, or amino group.

2. The toner fuser member of claim 1 wherein said member is a fuser roll.

3. The toner fuser member of claim 1 wherein said member is a fuser belt.

4. The toner fuser member of claim 3 wherein said fuser belt comprises a substrate formed of metal.

5. The toner fuser member of claim 4 wherein said metal is selected from the group consisting of steel, stainless steel, aluminum, copper, and nickel.

6. The toner fuser member of claim 3 wherein said fuser belt comprises a substrate formed of a thermoset organic polymeric material.

7. The toner fuser member of claim 6, wherein said thermoset organic polymeric material is selected from the group consisting of a polyimide, a polyamide, a polyamide-imide, a polycarbonate, and a polyester.

8. The fuser member of claim 7 wherein said thermoset organic polymeric material comprises a polyimide.

9. The toner fuser member of claim 1 wherein said amorphous fluoroplastic material is a polymer comprising tetrafluoroethylene units.

10. The toner fuser member of claim 9 wherein said polymer is a copolymer of tetrafluoroethylene and 1,2-bis(trifluoromethyl)methylenedioxy-1,2-difluoroethylene.

11. The toner fuser member of claim 1 wherein the priming agent composition comprises about 99.5 to 99.9 weight percent of said glycidyl end-capped polymer and about 0.1 to 0.5 weight percent of said perfluoroalkylsubstituted glycidyl-reactive compound.

12. The toner fuser member of claim 11 wherein Q is $SiR^6R^7R^8$, and at least one of $R^6$, $R^7$, and $R^8$ is Cl or an alkoxy group.

13. The toner fuser member of claim 3 wherein said layer of priming agent composition has a thickness of about $0.1\mu$ to about $2\mu$.

14. The toner fuser member of claim 13 wherein said thickness is about $0.5\mu$ to $1\mu$.

15. The toner fuser member of claim 3 wherein said surface layer has a thickness of about $1\mu$ to $20\mu$.

16. The toner fuser member of claim 14 wherein said thickness is about $5\mu$ to $10\mu$.

17. The toner fuser member of claim 3 wherein said surface layer has a surface energy of about 10 to 25 dynes/cm$^2$.

18. The toner fuser member of claim 3 providing a fused toner image having a $G_{20}$ gloss greater than 70.

* * * * *